Patented Aug. 4, 1953

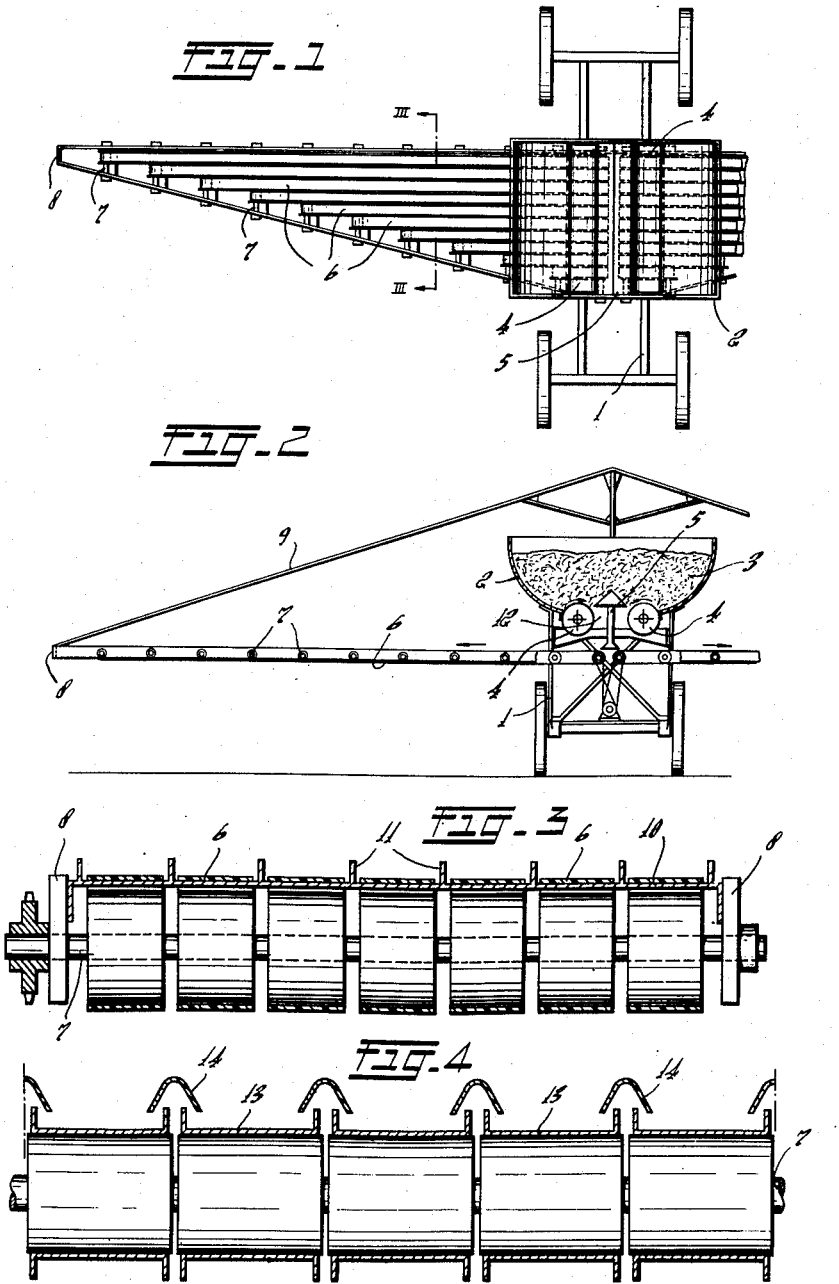

2,647,756

UNITED STATES PATENT OFFICE 2,647,756

DISTRIBUTING DEVICE FOR POWDERED OR GRANULAR MATERIAL

Barteld Pieter Allersma, Den Andel, Netherlands

Application May 16, 1949, Serial No. 93,608
In the Netherlands May 22, 1948

1 Claim. (Cl. 275—2)

This invention relates to a vehicle provided with a distributing device for powdered or granulated materials arranged below the discharge opening of a container and extending transversely of the vehicle, as known from U. S. Patent 2,416,898.

In this known machine the materials are distributed by being carried outwards to right and left and slightly upwards on a conveyor belt, off which belt they are scraped by V-shaped scraper blades arranged over the belt.

This machine has the drawback that the materials will be distributed unevenly because, for the greater part, they will be thrown over the edges of the belt either close to the machine or at the end of the belt.

The present invention provides an improvement of this known machine, which improvement is characterized by the fact that the distributing device comprises a plurality of means of mutually different distributing ranges, which means are disposed one after another in the direction of travel of the vehicle.

Thus a perfectly uniform distribution of the materials is obtained while at the same time there is a large distributing range.

If as in the said known machine, the distributing means consist of endless belts, partitions or partitioning ridges should be provided between the upper parts of the belts so that material is prevented from passing from one belt onto another.

This may also be achieved by providing the longitudinal sides of the belts with upstanding edges, so that in cross-section the belts will be trough-shaped.

In order to prevent material from falling through the gaps between the belts, capping plates can be arranged over said upstanding edges.

It may occur that some types of fertilizer will cake on the plates and the rollers for the belts.

In order to counteract this the inner side of the belts may be provided with scraper means, for example V-shaped thickenings of the belts, which will carry off the material towards the end of the plates.

As a proper scattering density should also be obtained in the neighbourhood of the center line of the distributing device, it is desirable that the discharge opening of the container extend to beyond the foremost or hindmost distributing means.

The invention is illustrated in greater detail with reference to the accompanying drawing showing an embodiment of the invention.

In the drawing:

Fig. 1 is a partial diagrammatic plan view of the device, the right wing of which has been broken away, Fig. 2 is a corresponding rear view, Fig. 3 is an enlarged section on the plane III—III in Fig. 1, and Fig. 4 shows a variant of the construction of the conveyor belts.

The reference numeral 1 denotes the vehicle, which carries a container 2 for the fertilzer 3 to be distributed.

This container has therein two rotors 4, located on either side of a dividing baffle 5, which facilitate the discharge (see Fig. 2).

Below the discharge openings 12 a plurality of endless belts 6 are located. The embodiment shown is symmetrical so that the belts extend to both sides.

The belts each differ in length so that the fertilizer is distributed in accordance with the lengths of the belts concerned.

The belts which may be driven in any suitable manner pass over rollers carried by shafts 7, which shafts are mounted in a frame 8 supported by tie rods or cables 9.

Below the upper parts of the belts, plates 10 are located which plates are provided with partitioning ridges 11.

The discharge openings 12 extend (Fig. 1) to beyond the shortest belt 6 so that fertilizer will also be scattered in the neighbourhood of the center of the distributing device and will, therefore, fall directly to ground.

The ridges 11 will impart a greater rigidity to the plate and will prevent fertilizer from passing from one belt to another, which might be effected by wind, slopes or shocks.

The device is excellently suited to be mounted on a conventional flat cart or on the platform of a flat top lorry. The device should be mounted sufficiently far towards the rear end of the cart or lorry that the belts which are shorter than half the width of the platform are clear thereof.

The upper side of either wing of the device may be screened from the wind by means of a plate.

The device may be partly rendered inoperative in a simple manner by closing part of the discharge openings of the container so that fertilizer will not drop onto a number of the belts.

Fig. 4 shows an embodiment in which the belts 13 are trough-shaped. They are provided with upstanding edges which will prevent loss in material.

In order also to exclude the possibility of the material falling through the gaps between the belts, capping plates 14 are used.

I claim:

In a vehicle provided with a distributing device for powdered or granulated materials arranged below the discharge opening of a container and extending transversely of the vehicle, a distributing device comprising a plurality of endless belts of mutually different distributing range, said belts being trough shaped and being disposed one behind another in the direction of travel of the vehicle, and capping plates over the upstanding edges of the trough shaped belts.

BARTELD PIETER ALLERSMA.

References Cited in the file of this patent

UNITED STATES PATENTS

| Number | Name | Date |
|---|---|---|
| Re. 554 | Cahoon | May 11, 1858 |
| 27,958 | Barnes | Apr. 24, 1860 |
| 660,600 | Taplin | Oct. 30, 1900 |
| 1,059,206 | Porcher | Apr. 15, 1913 |
| 1,072,504 | Robinson | Sept. 9, 1913 |
| 1,119,531 | Palmer | Dec. 1, 1914 |
| 1,445,797 | Pierce | Feb. 20, 1923 |
| 1,668,516 | Litchfield et al. | May 1, 1928 |
| 2,219,505 | Pierson et al. | Oct. 29, 1940 |
| 2,280,234 | Harvey | Apr. 21, 1942 |
| 2,350,476 | Richey | June 6, 1944 |
| 2,416,898 | Breeze | Mar. 4, 1947 |
| 2,538,961 | Biszantz et al. | Jan. 23, 1951 |

FOREIGN PATENTS

| Number | Country | Date |
|---|---|---|
| 584,809 | Great Britain | Jan. 23, 1947 |
| 597,224 | Great Britain | Jan. 21, 1948 |